US008484245B2

(12) United States Patent
Ha-Thuc et al.

(10) Patent No.: US 8,484,245 B2
(45) Date of Patent: Jul. 9, 2013

(54) LARGE SCALE UNSUPERVISED HIERARCHICAL DOCUMENT CATEGORIZATION USING ONTOLOGICAL GUIDANCE

(75) Inventors: Viet Ha-Thuc, Hue (VN); Jean-Michel Renders, Quaix-en-Chartreuse (FR)

(73) Assignee: Xerox Corporation, Norwalk, CT (US)

( * ) Notice: Subject to any disclaimer, the term of this patent is extended or adjusted under 35 U.S.C. 154(b) by 155 days.

(21) Appl. No.: 13/022,766

(22) Filed: Feb. 8, 2011

(65) Prior Publication Data
US 2012/0203752 A1 Aug. 9, 2012

(51) Int. Cl.
G06F 17/30 (2006.01)
(52) U.S. Cl.
USPC ........... 707/777; 707/776; 707/778; 707/779; 707/749; 707/803
(58) Field of Classification Search
USPC ................. 707/771, 776, 777, 778, 779, 707, 707/749, 730, 738, 803
See application file for complete search history.

(56) References Cited

U.S. PATENT DOCUMENTS

| | | | |
|---|---|---|---|
| 7,680,341 B2 | 3/2010 | Perronnin | |
| 7,689,625 B2 * | 3/2010 | Westerinen et al. ........... | 707/778 |
| 7,711,747 B2 * | 5/2010 | Renders et al. ................ | 707/771 |
| 7,756,341 B2 | 7/2010 | Perronnin | |
| 7,917,519 B2 * | 3/2011 | Kimbrough et al. .......... | 707/749 |
| 8,060,520 B2 * | 11/2011 | Koran ............................ | 707/759 |
| 8,234,263 B2 * | 7/2012 | Pradhan et al. ................ | 707/706 |
| 2011/0047166 A1 * | 2/2011 | Stading et al. ................. | 707/749 |
| 2011/0258229 A1 * | 10/2011 | Ni et al. ......................... | 707/776 |
| 2012/0078918 A1 * | 3/2012 | Somasundaran et al. ..... | 707/748 |
| 2012/0166179 A1 * | 6/2012 | Tirumalachetty et al. ........ | 704/9 |
| 2012/0166441 A1 * | 6/2012 | Karidi et al. ................... | 707/740 |

OTHER PUBLICATIONS

Avancini, H., et al., "Automatic Expansion of Domain-Specific Lexicons by Term Catergorizaion", ACM Transactions of Speech and Language Processing (TSLP), 2006, 3(1): pp. 1-29.
Blei, D. et al. "Hierarchical Topic Models and the Nested Chinese Restaurant Process", Advances in Neural Information Processing Systems. MIT Press, 2004, pp. 1-8.
Blei, D. et al. "Latent Dirichlet Allocation", Journal of Machine Learning Research, 2003, 3:993-1022.
Costa, E. et al. "A Review of Performance Evaluation Measures for Hierarchical Classifiers", Evaluation Methods for Machine Learning II: papers from the AAAI-2007 Workshop, 2007, AAAI Press, pp. 1-6.
Dayanik, A. et al. "Constructing Informative Prior Distributions from Domain Knowledge in Text Classification", Proceedings of SIGIR, 2006, ACM Press, pp. 493-500.

(Continued)

*Primary Examiner* — Debbie Le
(74) *Attorney, Agent, or Firm* — Fay Sharpe LLP

(57) ABSTRACT

A classification method includes constructing queries from category descriptors representing categories of a taxonomy of hierarchically organized categories. The query constructed for a category c includes a query component based on descriptors of the category c and at least one query component based on descriptors of an ancestor or descendant category of the category c. A documents database is queried using the constructed queries to retrieve pseudo-relevant documents. Language models for the categories of the taxonomy are extracted from the pseudo-relevant documents by inferring a hierarchical topic model representing the taxonomy. An input document is classified by optimizing mixture weights of a weighted combination of categories of the hierarchical topic model respective to the input document.

21 Claims, 7 Drawing Sheets

OTHER PUBLICATIONS

Dumais, S. et al. "Hierarchicdal Classification of Web Content", Proceedings of SIGIR, 2000, ACM Press, pp. 256-263.

Gaussier, E., et al. "A heirarchical model for clustering and categorising documents", Proceedings of ECIR, 2002, pp. 1-19.

Gliozzo, A. et al. "Improving Text Categorization Bootstrapping via Unsupervised Learning", ACM Transactions of Speech and Language Processing (TSLP), 2009, vol. 6, Article 1, pp. 1-24.

Godbole, S. et al. "Document classification through interactive supervision of document and term labels", Proceedings of PKDD, 2004, pp. 185-196.

Griffiths, T. et al. "Finding scientific topics", Proceedings of the National Academy of Sciences, 2004, vol. 101, pp. 5228-5235.

Ha-Thuc, V. et al. "News Event Modeling and Tracking in the Social Web with Ontological Guidance", Proceedings of IEEE International Conference on Semantic Computing, 2010, The University of Iowa, pp. 1-6.

Hofmann, Thomas. "Probabilistic Latent Semantic Analysis", Proceedings of Uncertainty in Artificial Intelligence, 1999, pp. 289-296.

Hung C.M., et al. "Web-based text classification in the absence of manually labeled training documents", JASIST, 2007, 58(1): 88-96.

Ko, Y. et al. "Learning with Unlabeled Data for Text Categorization Using Bootstrapping and Feature Projection Techniques", Proceedings of the 42nd Annual Meeting on Association for Computational Linguistics, 2004, pp. 1-8.

Koller, D. et al. "Hierarchically classifying documents using very few words", Proceedings of ICML, 1997, pp. 1-9.

Krithara, A. et al. "Semi-supervised Document Classification with a Mislabeling Error Model", Proceedings of ECIR, 2008, pp. 1-12.

Gaussier, E., et al. A heirarchical model for clustering and categorising documents, Proceedings of ECIR, 2002, pp. 1-19.

McCallum, A. et al. "Improving Text Classification by Shrinkage in a Hierarchy of Classes", 1998, pp. 1-9.

Minmo, D. et al. "Mixtures of Hierarchical Topics with Pachinko Allocation", Proceedings of ICML, ACM, 2007, pp. 633-640.

Sun, A. et al. "Hierarchical Text Classification and Evaluation", Proceedings of ICDM, 2001, pp. 521-528.

Toutanova, K. et al. "Text Classification in a Hierarchical Mixture Model for Small Training Sets", Proceedings of CIKM, ACM Press, 2001, pp. 105-113.

Veeramachaneni, S. et al. "Hierarchical Direichlet Model for Document Classification", Proceedings of ICML, ACM, 2005, vol. 119, pp. 928-935.

Wang, P. et al. "Towards a Universal Text Classifier: Transfer Learning using Encyclopedic Knowledge", Proceedings of ICDM Workshops, 2009, pp. 1-6.

Wetzker, R. et al. "An unsupervised hierarchical approach to document categorization", Proceedings of the IEEE/WIC/ACM International Conference on Web Intelligence, 2007, pp. 52-58.

Zhang, C. et al. "Knowledge Supervised Text Classification with No Labeled Documents", Proceedings of PRICAI, Springer, 2008, pp. 509-520.

* cited by examiner

LARGE SCALE UNSUPERVISED HIERARCHICAL DOCUMENT CATEGORIZATION USING ONTOLOGICAL GUIDANCE

BACKGROUND

The following relates to the classification arts, document organization arts, document processing arts, document storage arts, and so forth.

Document classification is useful to facilitate the organization, processing, and/or indexed storage of documents. In a conventional approach, a small "training" set of documents are annotated with classifications assigned manually, and the training set is used to train an automated classifier. Typically, the automated classifier classifies documents based on characteristics of the categories, represented by category profiles suitable for the type of document (e.g., weights associated to terms, phrases, or other features). In the case of classification based on textual content of documents, category profiles such as language models (e.g., a representation of statistical frequency of class-indicative words in documents) are suitably used.

This approach employing a training set can become unwieldy when the set of classes becomes large. The training set should include a representative number of documents for each category. By way of illustrative example, the IPTC taxonomy promulgated by the International Press Telecommunications Council (see, e.g., http://www.iptc.org/, last accessed Jan. 7, 2011) employs 1131 categories. Thus, the training set should include a representative number of training documents manually assigned to each category of this set of 1131 categories. If each category is represented by only ten documents, this entails over 11,000 manual annotations. (Note that for multi-class categorization a single document may be annotated with more than one class). The large number of manual annotations is time consuming, and can lead to human error that compromises the automated classifier performance, especially when the hierarchy is large, complex, and/or encompasses a diverse knowledge base so that manual annotations require the human annotator to have broad knowledge of all aspects of the hierarchy. In hierarchical classification (e.g., the IPTC taxonomy is organized hierarchically in five levels), the human annotator is potentially called upon to decide fine "shades" of content, so as to decide at which hierarchical level a given document should be located. Moreover, in some cases, a labeled training set may be unavailable for a given taxonomy.

The following sets forth improved methods and apparatuses.

BRIEF DESCRIPTION

In some illustrative embodiments disclosed as illustrative examples herein, a storage medium stores instructions executable by a processing device to perform a method comprising: generating a hierarchical classifier for a taxonomy of hierarchically organized categories; and classifying an input document using the generated hierarchical classifier. Each category of the taxonomy is represented by one or more textual category descriptors. The hierarchical classifier is generated by a method including (i) constructing queries from the textual category descriptors representing the categories and querying a documents database using the constructed queries to retrieve pseudo-relevant documents and (ii) extracting language models comprising multinomial distributions over the words of a textual vocabulary for the categories of the taxonomy by inferring a hierarchical topic model representing the taxonomy from at least the pseudo-relevant documents.

In some illustrative embodiments disclosed as illustrative examples herein, a method comprises: constructing queries from category descriptors representing categories of a taxonomy of hierarchically organized categories; querying a documents database using the constructed queries to retrieve pseudo-relevant documents; extracting category profiles for the categories of the taxonomy from at least the pseudo-relevant documents by inferring a hierarchical topic model representing the taxonomy; and classifying an input document by optimizing mixture weights of a weighted combination of categories of the hierarchical topic model respective to the input document. At least the constructing, extracting, and classifying operations are suitably performed by a digital processing device.

In some illustrative embodiments disclosed as illustrative examples herein, an apparatus comprises a digital processing device configured to generate a hierarchical classifier for a taxonomy of hierarchically organized categories. Each category of the taxonomy is represented by one or more category descriptors. The digital processing device generates the hierarchical classifier by a method including: constructing queries for categories of the taxonomy of hierarchically organized categories, the query constructed for a category c of the taxonomy including a query component constructed from one or more textual descriptors of the category c and at least one of (I) a query component constructed from one or more textual descriptors of an ancestor category of the category c and (II) a query component constructed from textual descriptors of one or more descendant categories of the category c; querying a documents database using the constructed queries to retrieve pseudo relevant documents; and extracting category profiles for the categories of the taxonomy from at least the pseudo relevant documents by inferring a hierarchical topic model representing the taxonomy.

DETAILED DESCRIPTION

Figure 1:
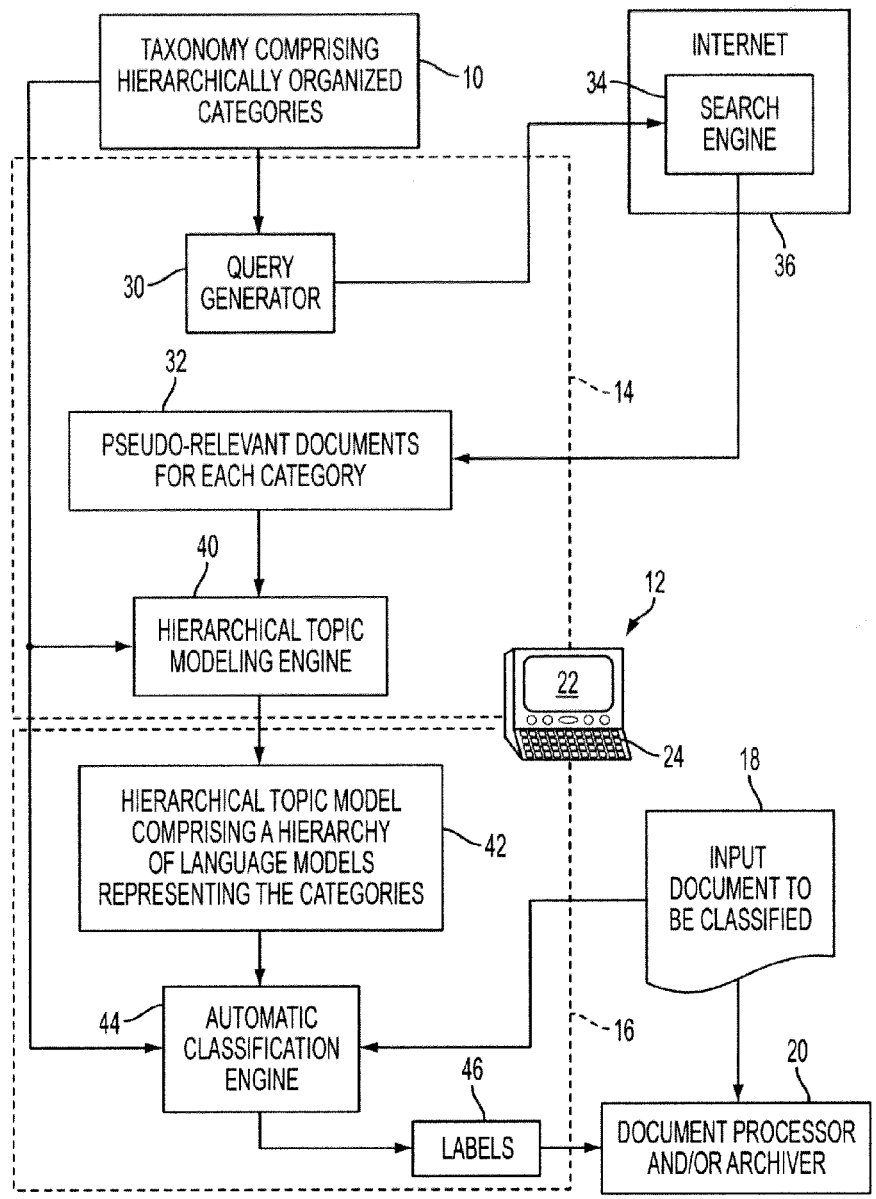
FIG. 1 diagrammatically shows an apparatus for generating and using an automated hierarchical classifier.

With reference to FIG. 1, the disclosed document classification apparatuses and methods operate in the context of a taxonomy 10 of hierarchically organized categories wherein each category is represented by one or more category descriptors. Without loss of generality, a particular category of the taxonomy 10 is suitably denoted herein as category c. Unless this category c is the top-level category, it has at least one ancestor category which is denoted herein as c↑. (Note that the ancestor category c↑ is not necessarily the immediate ancestor of the category c. Moreover, in the illustrative embodiments disclosed herein a fictitious all-encompassing "background" category is defined as the root category of the "tree" structure of the taxonomy 10, so that in these illustrative embodiments all nontrivial classes of the taxonomy 10 have at least one ancestor class c↑.) Similarly, unless the category c is a bottom level category (sometimes called a "leaf" category of the tree structure of the taxonomy 10), it has at least one descendant (or child) category which is denoted herein as c↓. (Again, note that the descendant or child category c↓ is not necessarily an immediate descendant or child of the category c. Also note that the category c may have one or more immediate descendant categories, whereas each category has at most one immediate ancestor category in the tree structure).

The hierarchical nature of the taxonomy 10 is readily distinguished from a "flat" classification taxonomy in which no class is related to any other class. The hierarchical nature of the taxonomy 10 is sometimes considered to be a complicating factor for generating a classifier operative to classify a document in accordance with the taxonomy 10. However, it is recognized herein that the hierarchical nature of the taxonomy 10 can actually be advantageously utilized in all phases of the classifier generation process, because the hierarchy provides context for categories. Consider the illustrative category c. If a given document is properly assigned to the category c, it follows that the document is also properly assigned to any and all ancestor categories c↑ of the category c. Thus, the ancestor categories c↑ provide (more general) context for the category c.

On the other hand, if the given document is properly assigned to the category c it does not necessarily follow that the document is properly assigned to any child category c↓ of the category c. It is readily understandable that the descendant categories c↓ provide specific examples of the category c, again providing contextual information for the category c.

The context provided by the taxonomy 10 is recognized herein to be useful in generating the hierarchical classifier without resort to manually labeled training documents. In the absence of manually labeled training documents (or if only a sparse set of labeled training documents is available, which is too small for training the hierarchical classifier), the information available for constructing the classifier is limited. The available information for a category c includes the category descriptor or descriptors provided by the taxonomy 10 for the category c (and, if some sparse set of manually annotated documents is available, any portion of the sparse set of labeled training documents that are labeled as pertaining to category c). It is recognized herein that the available information for the category c also includes the category descriptor or descriptors provided by the taxonomy 10 for any ancestor category or categories of the category c↑ and also includes the category descriptor or descriptors provided by the taxonomy 10 for any descendant category or categories c↓ of the category c.

With continuing reference to FIG. 1, a computer or other digital processing device 12 is configured to execute an algorithm or method 14 that generates a hierarchical classifier for the taxonomy 10, and is configured to execute an algorithm or method 16 that applies the generated classifier to classify an input document 18 in accordance with the taxonomy 10. A document processor and/or archiver 20 suitably uses classification information pertaining to the input document 18 provided by the classifier algorithm or method 16 in order to selectively process the input document 18, or to archive the input document 18 in a database (for example, indexed by the categories assigned to the document 18 by the classifier algorithm or method 16). The document processor and/or archiver 20 is also suitably implemented by the computer or other digital processing device 12 executing a processing and/or archiving algorithm. The computer or other digital processing device 12 may optionally include or have operative access to a display device 22 for displaying the assigned categories or other information derived from the assigned categories, and/or may optionally include a keyboard 24, mouse, touch screen, or other user input device or combination of user input devices via which relevant user input information is received, such as by way of illustrative example a user selection of the input document 18 for processing and/or archiving, or user manipulation of a taxonomy editing program (not illustrated) used to create and/or modify the taxonomy 10, or so forth.

In the illustrative example of FIG. 1 the same computer 12 is configured to execute both the classifier generation algorithm or method 14 and the classifier application algorithm or method 16. However, it is contemplated for the generation algorithm or method 14 and the application algorithm or method 16 to be implemented by different digital processing devices. For example, the classifier generation algorithm or method 14 may be executed on a computer owned or leased by a database product vendor in order to construct a hierarchical classifier for use in conjunction with a database product. The resulting hierarchical classifier application algorithm or method 16 is then provided to a customer in the form of a component of a commercial database product (e.g., the illustrative document processor and/or archiver 20). In such an embodiment, the hierarchical classifier application algorithm or method 16 is executed on the customer's computer or other digital processing device to perform document classification operations in conjunction with the customer's use of the database product (that is, the customer's execution of the document processor and/or archiver 20 on the customer's computer or other digital processing device). Moreover, it is to be recognized that the computer or other digital processing device that executes one or more of the algorithms or methods 14, 16, 20 may comprise a single processor, dual processor, quad-processor, parallel processor, computer network, or other type and/or arrangement of digital processors.

It will also be appreciated that the classifier generation algorithm or method 14 and the classifier application algorithm or method 16 may be physically embodied as a storage medium storing instructions executable by the computer 20 or another processing device to perform the algorithm or method 14, 16. By way of illustrative example, the storage medium may comprise one or more of the following: a hard disk drive or other magnetic storage medium; and/or an optical disk or other optical storage medium; and/or a FLASH memory, random access memory (RAM), read-only memory (ROM), or other electronic memory; or so forth.

The classification approaches disclosed herein are generally applicable to any type of data object that is describable using words, tokens, or equivalent data object elements. In the illustrative embodiments the documents are textual documents, by which it is meant that the documents include textual content. Textual documents, as that term is used herein, may optionally also include other types of content in addition to textual content, such as images, video clips, or so forth (e.g., what are sometimes referred to as "multimedia" documents) which are ignored when performing textually based classification. Textual documents may also include textual "metadata", such as textual tags applied to images contained in the document. In some embodiments any textual metadata is included as textual content of the document for classification purposes, while in other embodiments any textual metadata is ignored.

In the case of textual documents, the category descriptors of the hierarchical taxonomy 10 are suitably textual category descriptors comprising words, tokens, or phrases of a natural language (e.g., English, or French, or Chinese, or so forth). These textual descriptors may be isolated words, tokens, or phrases such as tags assigned to the category, and may be either ordered (for example, with the "most descriptive" words or phrases being first in the ordered list of category tags) or unordered. Additionally or alternatively, in some embodiments some or all of the textual descriptors may have grammatical order—for example some or all textual category descriptors may be textual sentences, paragraphs, or other grammatical units. The words, tokens, or phrases of the category descriptors are part of, or in some embodiments define, a vocabulary used in the classification. The category descriptors are generally manually assigned—however, it will be appreciated that the manual effort entailed in constructing the category descriptors is substantially less than the manual effort entailed in manually annotating a set of thousands, tens of thousands, or more representative "training" documents. Moreover, in some applications the taxonomy 10 including the category descriptors may be preexisting. For example, in some illustrative embodiments disclosed herein, the taxonomy 10 is the IPTC taxonomy commonly used by news media organizations, for which the categories have textual descriptors.

The disclosed illustrative examples pertain to classification of textual documents. However, the disclosed classification approaches are to be understood as being generally applicable to other types of documents in which a document can be considered to comprise elements (e.g., words or tokens) of a "language". For example, the documents to be classified may be images that are considered to comprise visual words of a visual vocabulary (see, e.g., Perronnin, "Generic visual categorization method and system", U.S. Pat. No. 7,756,341; and Perronnin, "Generic visual classification with gradient components-based dimensionality enhancement", U.S. Pat. No. 7,680,341, both of which are incorporated herein by reference in their entireties). In such image classification embodiments, the category descriptors are typically ordered or unordered sets of visual words.

In classification approaches disclosed herein, the "meaning" of a category c is not only defined by the category descriptor or descriptors of the category c, but also by the position of category c in the hierarchy and its relationships with other categories (e.g. its ancestors and/or descendants). The disclosed classification approaches take advantage of the ontological knowledge in all three phases of a three-phase classification process including (1) obtaining pseudo-relevant documents, (2) iterative training of language models (or, more generally, category profiles) for the categories, and (3) application of the hierarchical classifier for classifying an input document.

With continuing reference to FIG. 1, in the operation (1) of obtaining pseudo-relevant documents, the hierarchy is exploited by a query generator 30 to construct a context-aware query for each category. A documents database is then queried using the constructed queries to retrieve pseudo-relevant documents 32. In the illustrative example of FIG. 1, the constructed query is submitted to a web search engine 34 (possibly restricted to some sites or domains, such as Wikipedia) to retrieve pseudo-relevant documents for that category from the Internet 36 (or a domain-restricted portion of the Internet). Additionally or alternatively, another relevant database can be searched, such as a corporate database storing documents of a corporation. In embodiments in which a sparse set of manually labeled documents is available, the set of pseudo-relevant documents 32 may be augmented with these manually labeled documents.

The training operation (2) operates on the retrieved pseudo-relevant documents 32 (again, augmented by any available manually labeled training documents). These documents are said to be "pseudo-relevant" in that the documents retrieved by a query constructed for a given category c are generally expected to be relevant to the category c, but not all of the retrieved documents will generally be relevant to the category c. Said another way, the set of documents retrieved by the query generator 30 and query engine 34 for the category c are "noisy", that is, contain mostly relevant documents but with some documents (or some portions of documents) not being relevant to the category c. Additionally, the constructed queries may overlap insofar as different queries may retrieve textual content that overlaps. To compensate for noise and query overlap, the subsequently generated category profiles are generated by considering the retrieved documents globally, for all queries, in order to better discriminate what is the content of specific categories and more generic categories. Toward this end, a hierarchical topic modeling engine 40 extracts a hierarchical topic model 42 comprising a hierarchy of category profiles (e.g., language models in the case of text based analysis) representing the categories of the taxonomy 10. The language model for a category c comprises a multinomial distribution over the words of the textual vocabulary (in the case of classifying textual documents). More generally, a category profile comprises a statistical representation of features that could be associated to documents of a category. For example, in the case of image classification a suitable category profile may comprise multinomial distributions over visual words of a visual vocabulary that are representative of images assigned to the category. The hierarchical topic modeling engine 40 suitably operates by inferring the hierarchical topic model 42 representing the taxonomy 10 from the pseudo-relevant documents 32. In some illustrative examples disclosed herein, the hierarchical topic model 42 is a latent Dirichlet allocation (LDA) generative model with hierarchical extension, and the inferring of the hierarchical LDA generative model representing the taxonomy 10 comprises performing Gibbs sampling. Other topic models can be used, such as a probabilistic latent semantic analysis (PLSA) generative model with hierarchical extension. The hierarchical topic model approach is used by the modeling engine 40 to extract a language model (e.g., a multinomial distribution over words for textual document classification) for each category of the taxonomy 10.

The topic model inference advantageously serves to reduce noise of the pseudo-relevant documents 32 and to resolve ambiguities due to overlapping queries. Even though the query generator 30 constructs "context-aware" queries, the retrieved pseudo-relevant documents 32 may still contain a substantial amount of noise. The hierarchical topic modeling performed by the modeling engine 40 utilizes relationships amongst categories defined in the hierarchy of the taxonomy 10 to exclude noise, to identify really relevant parts in pseudo-relevant documents 32, and to estimate category language models from these relevant parts.

The classification application operation (3) is performed by an automatic classification engine 44 using the extracted category language models. The hierarchical structure of the taxonomy 10 is again exploited to classify the input document 18 into one or more categories, as indicated by suitable category labels 46. (In general, the classifier approaches disclosed herein provides multi-label classification in which a given document may be assigned to, or labeled by, one, two, or more categories that are not hierarchically related in the taxonomy 10. However, it is contemplated for the number of labels of the category labels 46 to be as few as a single label.) In the illustrative examples disclosed herein, the hierarchical structure is used by the classification engine 44 to decompose the overall classification task into a set of simpler classification sub-tasks. This is a top-down approach that still allows multiple paths to be followed in parallel in the hierarchy tree of the taxonomy 10. In top-down approaches generally, cascading errors are a prevalent issue. The top-down classification approaches disclosed herein suppress cascading errors by softening the decisions at upper levels. Moreover, when making decisions at these levels, the disclosed illustrative approach also takes into account information propagated from lower levels (that is, a bottom-up component is also included in the input document classification process).

The category labels 46 output by the classification engine 44 for the input document 18 are suitably used by the document processor and/or archiver 20 to selectively process the input document 18 based on its classification 46, and/or to archive the input document 18 using the category labels 46 as indexing tags or otherwise organizing the input document 18 in a database or other archive based on the category labels 46.

Figure 2:
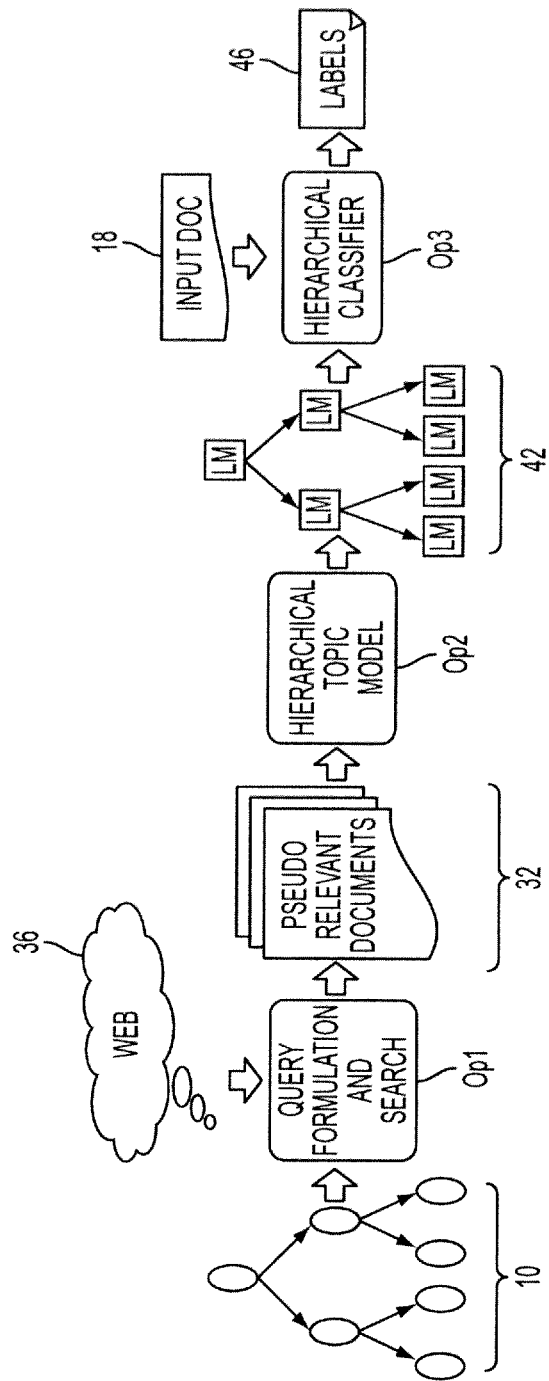
FIG. 2 diagrammatically shows a classifier generation and application process suitably performed by the apparatus of FIG. 1.

With brief reference to FIG. 2, the classification approach implemented by the classifier generation and application algorithms or methods 14, 16 of FIG. 1 is diagrammatically shown. The hierarchical taxonomy 10 is processed in an operation Op1 implemented by the query generator 30 and the query engine 34 to retrieve the pseudo-relevant documents 32. The operation Op1 exploits the hierarchy to construct an enriched and context-aware query for each category. For each category c, its ancestor categories $c\uparrow$ are used to define a context for the category c and to at least partially resolve possible ambiguities. Children categories $c\downarrow$ of the category c are suitably used as special cases to enrich the query as well. The query is then submitted to a web search engine to get pseudo-relevant documents for the category.

An operation Op2 performed by the hierarchical topic modeling engine 40 extracts language models (each language model is designated by the label "LM" in FIG. 2) comprising multinomial distributions over the words of the vocabulary for the categories of the taxonomy 10 by inferring the hierarchical topic model 42 representing the taxonomy 10 from the pseudo-relevant documents 32. Given the pseudo-relevant documents 32 for categories, a language model (multinomial distribution over words) is extracted for each category. Even though the operation Opt generates and uses enriched and context-aware queries, the retrieved pseudo-relevant documents 32 still may contain substantial noise and/or overlapping content with other categories (especially ancestor categories) that could blur the language models. The operation Op2 provides some exclusion of noise (that is, non-relevant document parts) and identifies really relevant parts in training documents. The category language models are estimated from the relevant parts only. In a suitable approach, the noise exclusion is achieved by using a hierarchical topic model extracting a language model for each category c by using the pseudo-relevant documents retrieved by the query for category c and also the position of category c in the hierarchy and its relationships with other categories.

An operation Op3 performed by the automatic classification engine 44 generates the category labels 46 for the input document 18 based on the extracted category language models. In illustrative examples disclosed herein, the hierarchical structure is used to decompose the classification task into a set of simpler ones in a top-down manner. To alleviate the issue of cascading error, which is common in some top-down approaches, decisions at upper levels are softened. Moreover, when making decisions at these levels, the approach also takes into account information propagating from lower levels (bottom-up). The illustrative approach disclosed herein is based on a hierarchical extension of the inference algorithm for LDA (Latent Dirichlet Allocation), that integrates by construction the document context into word features to resolve any polysemy issues. (Polysemy relates to a word that has different senses for different categories. For example, the word "race" has a different sense with respect to category "motorcycling" as compared with respect to the category "people").

Having set forth the overall algorithm including the pseudo-relevant documents retrieval operation Op1, the language model extraction operation Op2, and the classifier application operation Op3, some further optional aspects and examples of these operations are next set forth.

Query construction is performed by the query generator 30 as part of the pseudo-relevant documents retrieval operation Op1. A suitable form for the query constructed for a category c is $Q(c)=w_1 q(c)+w_2 q(c\uparrow)+w_3 q(c\downarrow)$, where $q(c)$ is a query component constructed based on the textual descriptor or descriptors of the category c, $q(c\uparrow)$ is a query component constructed based on the textual descriptor or descriptors of one or more ancestor categories $c\uparrow$ of the category c (for example, based only on the immediate ancestor, or based on the immediate ancestor with a lesser contribution from a more remote ancestor if present, or so forth), $q(c\downarrow)$ is a query component constructed based on one or more child or descendant categories $c\downarrow$ of the category c (for example, based only on the immediate child or children, or based on the immediate child or children with a lesser contribution from a more remote children if present, or so forth), and $w_1$, $w_2$, and $w_3$ are weights of the weighted sum. The query components $q(c\uparrow)$ and $q(c\downarrow)$ advantageously provide oncological context to the query $Q(c)$. For example, if the category c is "financial institutions", then the query component $q(c)$ by itself may retrieve documents containing the word "bank", including wholly irrelevant documents relating to geography of rivers (since "bank" can also refer to the edge of a river). By including the parent query component $q(c\uparrow)$ relating to an ancestor category such as "business organizations", the query $Q(c)$ is biased away from retrieving documents relating to geography of rivers. In similar fashion, including the child query component $q(c\downarrow)$ relating to more specific examples of financial institutions such as specific banking institutions also biases away from retrieving documents relating to geography of rivers. The contextual query components $q(c\uparrow)$ and $q(c\downarrow)$ are preferably weighted or otherwise configured to have less impact on the total query $Q(c)$ than the query component $q(c)$. Moreover, the query $Q(c)$ may optionally omit the parent or child component, e.g. $Q(c)=w_1 q(c)+w_2 q(c\uparrow)$ or $Q(c)=w_1 q(c)+w_3 q(c\downarrow)$ are also contemplated.

For each category c, the query generator 30 constructs a corresponding query $Q(c)$ that is submitted to the search engine 34 associated with a database (typically the Internet 36, although a corporate database or other database is also contemplated). The top k retrieved documents retrieved by the query $Q(c)$ are suitably taken as the pseudo-relevant documents for the category c. In some illustrative examples disclosed herein, the taxonomy 10 is the IPTC taxonomy which is designed to classify news items and events in the journalism and telecommunication industry. The IPTC taxonomy has been adopted by various news agencies, and hence represents a "real world" example of a practical taxonomy. The IPTC taxonomy at present includes 1131 categories hierarchically organized in five levels. These categories cover diverse domains including arts and culture, weather forecasts, crimes, disasters, politics, education, economics, and so forth. Considering by way of illustrative example the category 'security' (economic sector/computing and information technology/security), the upper level categories (e.g. "computing and information technology") specify the global context of the category and, as such, they are useful to disambiguate with respect to categories having similar (or even the same) titles (for example "securities" (market and exchange/securities).

On the other hand, given a category, for instance "economic indicator", its sub-categories (that is, its child categories in the hierarchy) such as "gross domestic product" and "industrial production" are also useful. The sub-categories are special cases of the parent category and, as such, can be used to enrich the corresponding query. In view of this, the query Q(c) for a category c is constructed by combining the title and description textual descriptors of the category c with the title and description textual descriptors of its parent category c↑ and child category or categories c↓, giving reduced weighting to the latter query components q(c↑) and q(c↓) of the query Q(c). The queries are then sent to the web search engine 34. In some actually performed embodiments, two searches were performed for each query Q(c). The first search was a general Internet search without any domain restriction, and the top-50 retrieved documents were taken as pseudo-relevant documents for the category c. The second search was domain-limited to the Wikipedia site (domain: wikipedia.org), and the top-10 retrieved documents were taken as pseudo-relevant documents. The two sets of pseudo-relevant documents were merged to produce sixty retrieved pseudo-relevant documents 32 for the category c. This is merely an illustrative example, and other query strategies may be employed. In some embodiments, the pseudo-relevant documents returned by the query may be combined with a small set of category-positive training data generated by manual annotating. (This corresponds to an extension to a sparsely labeled dataset).

The operation Op2 performed by the hierarchical topic modeling engine 40 extracts language models comprising multinomial distributions over the words of the vocabulary for the categories of the taxonomy 10. Given the pseudo-documents for the categories of the taxonomy 10, a language model p(word|category) is estimated for each category. In estimating the language models, it is recognized herein that the pseudo-relevant documents for a category c may contain portions that are not relevant to the category c. For example, a pseudo-document pertaining to a "show of a rock band in London" does relate to a category "rock music" —but, it could also contain terms relevant to more general categories such as "music" and "art and entertainment". It could also contain terms specific to the local context of the document, such as London, or proper names of the bar at which the show was performed, or names of individual band members. Not removing the general terms could make the language model for "rock music" highly overlapping and confusing with the language models for its sibling categories such as "folk music" or "country music". On the other hand, not excluding the document-specific terms could make the language model for the category "rock music" over-fit to its training set.

On the one hand, in the retrieval phase (that is, operation Op1) enriching the search query for each category by taking information of its parent and children categories into account is advantageous for reducing ambiguities. On the other hand, this enrichment tends to make the queries and consequently the retrieved pseudo-relevant documents 32 of categories highly overlapping with their ancestor or descendant categories. The operation Op2 compensates for this overlap. As the operation Op2 extracts the language models from the pseudo-relevant documents 32, it also automatically associates the correct level of specificity or generality for each token in the pseudo-relevant document.

The disclosed language model extraction operation Op2 operates to extract the language models by inferring a hierarchical topic model with ontological guidance provided by the taxonomy 10. This approach advantageously takes into account the fact that although a pseudo-relevant document d may be relevant to a category c in the hierarchy, it could also have some portions that are not relevant to the category c. The pseudo-relevant document d is hypothesized to be generated by a mixture of multiple topics including: the category c itself; its ancestor category or categories c↑ which explain general terms (including in the illustrative embodiments a fictitious "background" topic located at the root of the taxonomy 10 which explains the general English vocabulary), and a document-specific topic $t_o(d)$ responsible for generating terms on other themes also mentioned in the document. These terms are specific to the document context and are not relevant to the category c or its ancestor category or categories c↑. The contributions of these topics to the pseudo-relevant documents are automatically inferred by the topic modeling, and only truly relevant document portions (that is, the document portions generated by the category c itself) will contribute to the estimated language model for the category c.

In the following, an illustrative example of the operation Op2 is described. Let W denote the number of words in the vocabulary, and let $L_c$ denote the level of the category (or topic) c in the hierarchy. A fictitious background category b is located at the root, that is, $L_b=0$. The multinomial distributions (that is, the language models of the different topics, including the background) are denoted by $\Phi_x$ where the subscript "x" denotes the category or topic. These multinomial distributions are sampled from a W-dimensional Dirichlet distribution with hyper-parameters β, denoted by W-Dir(β). Any pseudo-relevant document d (for category c) will be modeled as a mixture of multinomial distributions for topics in the path from the root category b to the category c itself and a document-specific topic $t_o(d)$. Accordingly, the corresponding mixture weights are denoted by $\Theta_d$, which is sampled from a Dirichlet distribution with hyper-parameters α. A suitable generative process within this illustrative framework is as follows:

---
Algorithm Listing 1: Generative Process
---

1. Pick a multinomial distribution $\Phi_b$ for the background language model from W-Dir(β)
2. For each topic c in the hierarchy:
    2.1 Pick a multinomial distribution $\Phi_c$ from W-Dir(β)
    2.2 For each document d that is a pseudo-relevant document for the category c:
        2.2.1 Pick a multinomial $\Phi_{to(d)}$ from W-Dir(β)
        2.2.2 Pick a mixing proportion vector $\Theta_d$ for ($L_c$+2) topics T={b,...,c,$t_o(d)$} from ($L_c$+2)-Dir(α)
        2.2.3 For each token in d:
            2.2.3.1 Pick a topic z in set T from $\Theta_d$
            2.2.3.2    Pick a word w from $\Theta_z$ The scope of the background or root topic b is common to all training documents. The scope of a topic c in the hierarchy covers documents in the corresponding subtree (i.e. pseudo-relevant documents associated to the category c itself and pseudo-relevant documents associated to its descendant categories c↓, if any). The scope of $t_o(d)$ includes only the document d. Therefore, the background category b will explain words commonly appearing in all training documents of all categories. Said another way, the background category b corresponds to the stop words. Each topic c generates words relevant to the top level of the sub-tree it represents. More general words are explained by its ancestor categories $c\uparrow$, while more specific words are explained by its descendant categories $c\downarrow$ or by $t_o(d)$. In each document d, the topic $t_o(d)$ generates words specific to the context of the document but not relevant to any category from the root b to the topic t to which the document d belongs. Thus, the semantic meaning of a category c is not only determined by its own pseudo-relevant documents (that is, the pseudo-relevant documents retrieved by the query Q(c)), but also by its relationships to other categories in the tree.

All multinomial distributions for categories and category mixing proportions in documents are automatically inferred using a variant of the Gibbs sampling technique to infer or estimate all latent variables and distribution parameters (multinomial distributions and mixing proportions in documents) given the observed variables (the tokens in documents). A suitable Gibbs sampling algorithm for this purpose is as follows:

---

Algorithm Listing 2: Gibbs sampling algorithm

1. Initialize variables $\phi_z^{(0)}$ and $\phi_d^{(0)}$ for all topics and all pseudo-relevant documents
2. For s=0 to the desired number of iterations:
   2.1 For each token in a pseudo-relevant document d of a category c:
   Sample its latent topic $z^{(s+1)}$ in the set $T=\{b, \ldots, c, t_o(d)\}$ from the distribution $p(z \mid w,d) \propto p(w \mid z)p(z \mid d) = \phi_{z,w}^{(s)}\phi_{d,z}^{(s)}$
   2.2 Update $\phi_z^{(s+1)}$ for all topics:

$$\phi_{z,w}^{(s+1)} = p(w \mid z) = \frac{m_{z,w}^{(s+1)} + \beta}{\sum_{w'=1}^{W}(m_{z,w'}^{(s+1)} + \beta)}$$

2.3 Update mixture weights for each training document d:

$$\theta_{d,z}^{(s+1)} = p(z \mid d) = \frac{n_{d,z}^{(s+1)} + \alpha}{\sum_{z'=T}(n_{d,z'}^{(s+1)} + \alpha)}$$

---

In Step (1) of this sampling algorithm, the parameters of multinomial distributions ($\Phi_c$) are initialized by their maximum likelihood estimates from pseudo-relevant documents belonging to the corresponding sub-tree, and each $\Phi_{t_o(d)}$ is initialized by its maximum likelihood estimate from document d. Mixing proportions in all documents are initialized uniformly. In each iteration of Step (2) of the sampling algorithm, sampling of latent topic generating each token from its posterior is performed (Step (2.1)). After sampling for all tokens, the multinomial distributions and mixing proportions are updated (Steps (2.2) and (2.3)), where $m_{z,w}$ is the number of times word w is assigned to topic z, and $n_{d,z}$ is the number of times topic z is assigned to a token in document d. These sampling and updating steps are repeated until convergence. Optionally, a value may be set for the maximum number of iterations.

The operation Op3 performed by the automatic classification engine 44 generates the category labels 46 for the input document 18 based on the extracted category language models. In a suitable approach, the input document 18 is classified based on inferring mixture weights for combining language models of the categories of the taxonomy so as to optimally match the multinomial distribution of words of the input document 18 over the words of the textual vocabulary. Said another way, the operation Op3 classifies the input document 18 by inferring mixture weights so as to explain the input document 18 as a mixture (or, more precisely, an ad-mixture) of the language models of a category c and its ancestor categories $c\uparrow$. The document 18 is then labeled with those categories having high inferred mixture weights, where the category selection is based on a mixture weight threshold, a "top-N" categories criterion, or other suitable selection criterion. (Note that, as used herein, terms such as "optimally matched mixture weights", "optimized mixture weights", or so forth are to be understood as encompassing mixture weights generated by an automated optimization algorithm, even if those weights do not produce a globally best match with the document 18. That is, inferring mixture weights for combining language models to optimally match the multinomial distribution of words of the input document 18 may generate mixture weights that do not provide a globally best match. Said yet another way, the inference may be an approximate inference.) In general, the input document 18 could be assigned to multiple categories at different levels of abstractions in the hierarchy, based on the inferred mixture weights of the categories. In an illustrative embodiment of the classification operation Op3, it is assumed that the input document 18 is generated by a mixture of the language models of all categories in the inferred topic model 42. In this approach, if some category is totally irrelevant to the document, its mixture weight will be close to zero. With this approach, the multi-label classification problem can be seen as the task of inferring mixture weights given the input document 18 and the language models of all categories (or topics) of the topic model 42.

In an illustrative example, a solution to this inference problem is approximated by using a sampling approach, keeping the language models fixed. For a token of a word w in the input document d (here a token is a particular occurrence of a word in a document), the latent topic generating the token is sampled from the posterior probability distribution p(c|w,d), where c ranges over the categories (or topics) in the hierarchy, including the root category or topic b. Latent topics are iteratively sampled for tokens in the document until convergence. Then, the categories are ranked by their mixture weights p(c|d), estimated from the samples. The hierarchical structure is exploited to decompose the sampling step for each token into sub-steps. Thus, in the illustrative approach in which the inference is approximated by sampling, the problem is not solved globally (that is, for all levels of the hierarchy simultaneously), but rather the problem is decomposed into multiple sub-problems that correspond to (soft) decisions at each level. The sampling algorithm starts from the root (that is, c=b).

Figure 3:
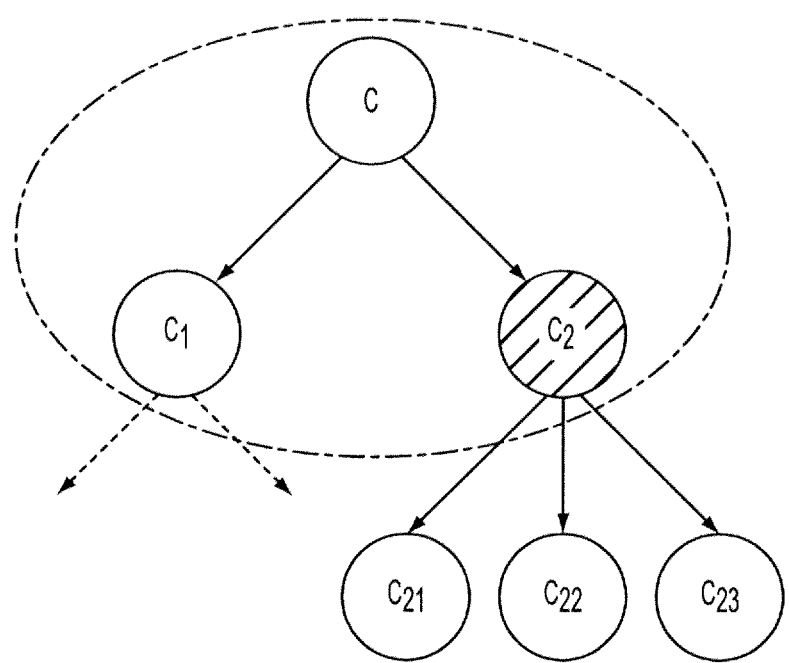
FIG. 3 diagrammatically shows a portion of a hierarchical taxonomy hierarchically organized categories for reference in describing aspects of the operation of the classifier of FIG. 1 and classification method of FIG. 2.

With brief reference to FIG. 3, assume by way of illustrative example that c has two children c1 and c2. The algorithm probabilistically decides if the token is generated by c or a node in one of the two sub-trees by sampling in the set $S=\{c, c_1^{subtree}, c_2^{subtree}\}$ (where $c_i^{subtree}$ is a pseudo-topic representing the whole sub-tree rooting at $c_i$) from posterior distribution in accordance with the following:

$$p(z|w,d) \propto p(w|z)p(z|d), z \in \{c, c_1^{subtree}, c_2^{subtree}\} \quad (1).$$

In Equation (1), p(c|d) indicates how much category c contributes to the content of document d, and $p(c_i^{subtree}|d)$ indicates how much all of the categories in subtree $c_i^{subtree}$ contribute to the content of document d. These probabilities are suitably estimated iteratively. The term p(w|c) is estimated as part of the operation of the hierarchical topic modeling engine 40 (that is, as part of the operation Op2) and hence can be reused here. The term $p(w|c_i^{subtree})$ is a multinomial distribution representing the language model of the whole sub-tree rooting at $c_i$. It is estimated as a weighted average of the multinomial distributions corresponding to all nodes belonging to the sub-trees including $c_i$ itself according to:

$$p(w \mid c_i^{subtree}) = \sum_{z \in c_i^{subtree}} p(w \mid z) p(z \mid c_i^{subtree}). \quad (2)$$

In Equation (2), $p(z \mid c_i^{subtree})$ can be estimated as a uniform distribution or by maximum likelihood from samples generated in the inference algorithm (that is, Algorithm Listing 2). If topic c is picked, then the latent topic for the token is determined. On the other hand, if one of the subtrees is picked ($c_2^{subtree}$, for instance), then it follows that the token is generated by a node in the sub-tree $c_2^{subtree}$ rooting at $c_2$. In this case, the algorithm proceeds to this sub-tree $C_2^{subtree}$ (see FIG. 3) and repeats the process until the latent topic is determined.

In the foregoing hierarchical sampling process for approximating the inference, a token is assigned to topic c only if it is also assigned to all sub-trees rooting at ancestors of the topic c. On the other hand, when the algorithm decides to assign a token to a sub-tree, the algorithm takes information from all the nodes in the sub-tree into account (see Equation (2)). So, when sampling at a particular level in the hierarchy, the algorithm uses information propagated both top-down and bottom-up to alleviate possibly inaccurate estimations of probabilities p(w|c) for some words w and categories c. Moreover, by hierarchically decomposing the sampling, the algorithm can significantly reduce the number of nodes that are considered, resulting in computational complexity of order O(log (n)), which is sub-linear in n.

In this approach, when the algorithm reaches the node c, as in the example above, and makes a choice amongst c and any descendant subtrees $c_j^{subtree}$, the information of ancestors of c is no longer needed since it is the same for all of the considered choices c and any subtrees $c_j^{subtree}$. The multinomial distributions of the categories can advantageously avoid redundant processing of the common features, and instead can focus on features distinguishing each of the options c and any subtrees $c_j^{subtree}$. If, by way of illustrative example, $c_2^{subtree}$ is sampled, the algorithm proceeds in this direction. At that time, it then uses the multinomial of $c_2$ itself, not $c_2^{subtree}$ (said another way, the bottom-up information is removed) to distinguish category $c_2$ from its child categories c↓ (e.g., child categories $c_{21}$, $c_{22}$, and $c_{23}$ in the illustrative example of FIG. 3). Thus, the algorithm uses both top-down and bottom-up information in an adaptive way to alleviate the problem of noise in topic language model estimations as well as to maintain discriminative power of these language models.

The illustrative classification algorithm suitably used for the operation Op3 is set forth as follows:

---

Algorithm Listing 3: Hierarchical classification algorithm

Input: (i) a topic hierarchy and language models of all topics and of all pseudo-topics corresponding to subtrees in the hierarchy (the latter being determined from the language models of topics of the hierarchy using Equation (2))
    (ii) an input document d
Output: p(z|d) for all topics z
Algorithm:
1. Initialize p(z|d) uniformly for all topics in the hierarchy
2. Loop for a desired number (N) of iterations:
    2.1 For each token in document d:

---

Algorithm Listing 3: Hierarchical classification algorithm 2.1.1 Loop for M times:
        2.1.1.1 Current_node=b
        2.1.1.2 Let $c_1, c_2, \ldots, c_P$ denote the children of Current_node and $c_1^{subtree}, c_2^{subtree}, \ldots, c_P^{subtree}$ denote pseudo-topics representing the corresponding subtrees.
        2.1.2.3 Sample a latent topic for the token in the set
        S = {Current_node, $c_1^{subtree}, c_2^{subtree}, \ldots, c_P^{subtree}$} from the distribution $p(z \mid w,d) \propto p(w \mid z) p(z \mid d)$, z ∈ S where $p(c_i^{subtree} \mid d) = \sum_{z \in c_i^{subtree}} p(z \mid d)$ 2.1.2.4 If one of the pseudo-topics for instance $c_2^{subtree}$, is picked, then:
            Current_node=$c_2$
            Go to Step 2.1.1.1
    2.2 Update p(z|d) for all topics z from samples generated above by maximum likelihood.

---

In this algorithm, the mixture weights are initialized uniformly (Step 1). In Step 2.1, for each token, the algorithm samples its latent topics from the corresponding posterior distribution. This sampling step is performed in a top-down manner starting from the root as described earlier. To avoid the issue of cascading errors, the algorithm "softens" its behavior by doing the sampling M times. When sampling (Step 2.1.2.3), the topic mixing proportions p(z|d) are integrated in the posterior probabilities. This factor representing the context of document d aims to resolve word ambiguity. For example, if the document d is an article about a fishing resort, then terms in the document d such as "fish", "fishing" or "boat" have high likelihood p(word|topic) in both the topic "travel" and the topic "fishing industry". However, by taking the context of the document into account, the algorithm can recognize that these terms are not used in the context of topic "fishing industry". After generating M samples for all tokens, the algorithm re-updates the mixture weights (Step 2.2). The whole process is iterated N times. The values M and N are parameters that can be selected to optimize performance of the hierarchical classification.

In terms of computational complexity, when sampling latent topics for each token, the algorithm takes advantage of the hierarchical structure to significantly reduce the number of topics it needs to consider. The number of topics it explores is O(log(n)), where n is the number of categories. The complexity of the algorithm is then O(|d|×log(n)×N×M), where M and N are both constants. Thus, the complexity is proportional with log(n), and the hierarchical classification algorithm scales well when then number of categories increases, as in the case of large-scale classification.

Aspects of embodiments of the disclosed hierarchical classification approaches have been reduced to practice using the IPTC taxonomy. This taxonomy contains 1131 categories, organized in a tree that contains up to five levels. The first level contains 17 main topics, covering domains such as business, economics, education, religion, crimes, disasters, weather, and so forth. The lowest (i.e., leaf) level contains the most specific topics, such as "assisted suicide" or "methodist christians". The average number of child categories is around three in this hierarchy. The textual category descriptors for each category include a title (typically two or three words) and a short description of about 25 words on average.

The evaluation set consists of a collection of 1130 news items (available on the web site of the SYNC3 European Project: www.sync3.eu), crawled on the web sites of four news agencies (CNN, Reuters, France24 and DW-World), during the first two weeks of June 2010. The preprocessing consisted in cleaning the hypertext markup language (HTML) files by removing boilerplate and so forth, and stemming and removing stopwords. To provide a basis for comparison, two independent human annotators with journalism backgrounds performed manual labeling of this set of 1130 news items. For each item, the human annotators were allowed to give as many labels as they wanted, provided that they used the most specific ones in the trees.

Figure 4:
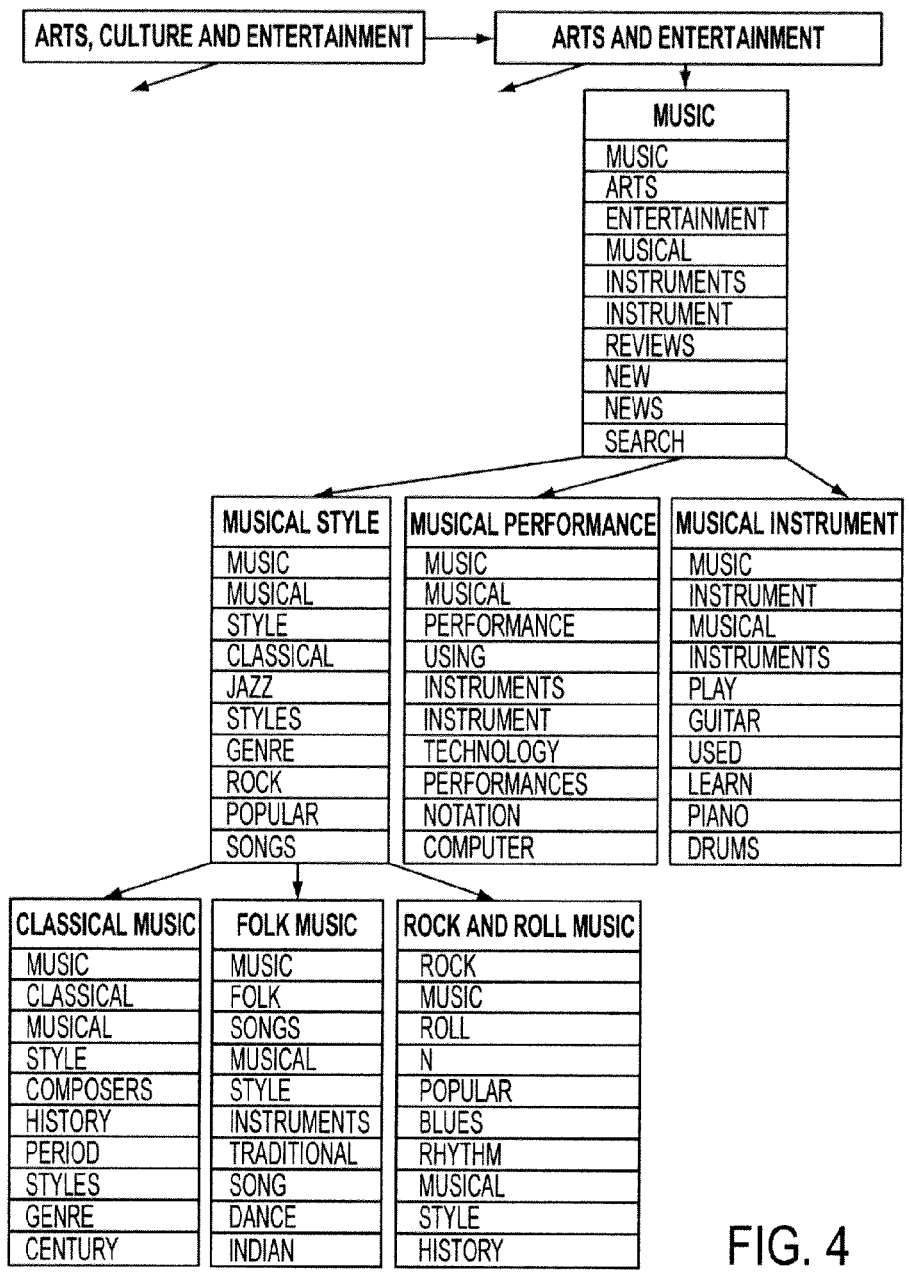
FIGS. 4-7 present experimental results as described herein.
Figure 5:

With reference to FIGS. 4 and 5, the hierarchical topic modeling engine 40 performing the operation Op2 for estimating category language models was compared with a standard maximum likelihood (ML) approach. The two approaches both utilized as inputs (1) the IPTC topic hierarchy and (2) pseudo-relevant documents retrieved using the query generator 30 performing the retrieval operation Op1 as described herein. FIG. 4 shows the top terms of language models of categories in a segment of the hierarchy extracted by the standard ML approach. FIG. 5 shows the top terms of language models of categories in the same segment of the hierarchy extracted by the approach disclosed herein. Comparing language models for topic "music" (at third level) extracted by the two approaches, it is seen that the language model of FIG. 4 (standard ML) contains terms that are too general to effectively characterize the category of "music", such as the general terms "art", "entertainment", "news" and "search" on top. On the other hand, most of the top terms in the language models extracted by the approach disclosed herein (FIG. 5) are manifestly relevant to the topic "music" without being overbroad or too general.

At the fourth level, in FIG. 4 (standard ML) general musical terms such as "music" and "musical" are ranked high in the language models of categories "musical style", "musical performance" and "musical instruments". These terms, however, have little power to differentiate each of these categories with respect to their sibling or parent categories. The language model of the category "musical performance" in the standard ML (FIG. 4) is also seen to contain some non-relevant terms such as "instruments" and "instrument" on top. It is believed that this is caused by noise in the pseudo-relevant documents retrieved for this category by the retrieval operation Op1. Most likely, some of the pseudo-relevant documents retrieved for the category "musical performance" additionally or alternatively contained content more closely related to the topic "musical instruments". Since the standard ML approach assumes all parts of the document are relevant, it was unable to exclude this noise. The disclosed approach employing the operation Op2, on the other hand, exploits the relationships amongst the categories to automatically exclude non-relevant document content as well as content that could be related to more generic categories (that is, ancestor categories) or more specific categories (that is, child categories). As a result, the non-relevant terms do not appear on top of the language model for "musical performance" extracted by the operation Op2 (FIG. 5).

Similarly, at the lowest level, language models in FIG. 4 (standard ML) contain general terms, while the language models in FIG. 5 (operation Op2 disclosed herein) focus on terms that are unique for the category at this level. Due to the space limit, FIGS. 4 and 5 show language models of topics in a segment of the hierarchy extracted by the two approach; however, the patterns manifest in FIGS. 4 and 5 were observed consistently across the whole hierarchy.

Figure 6:
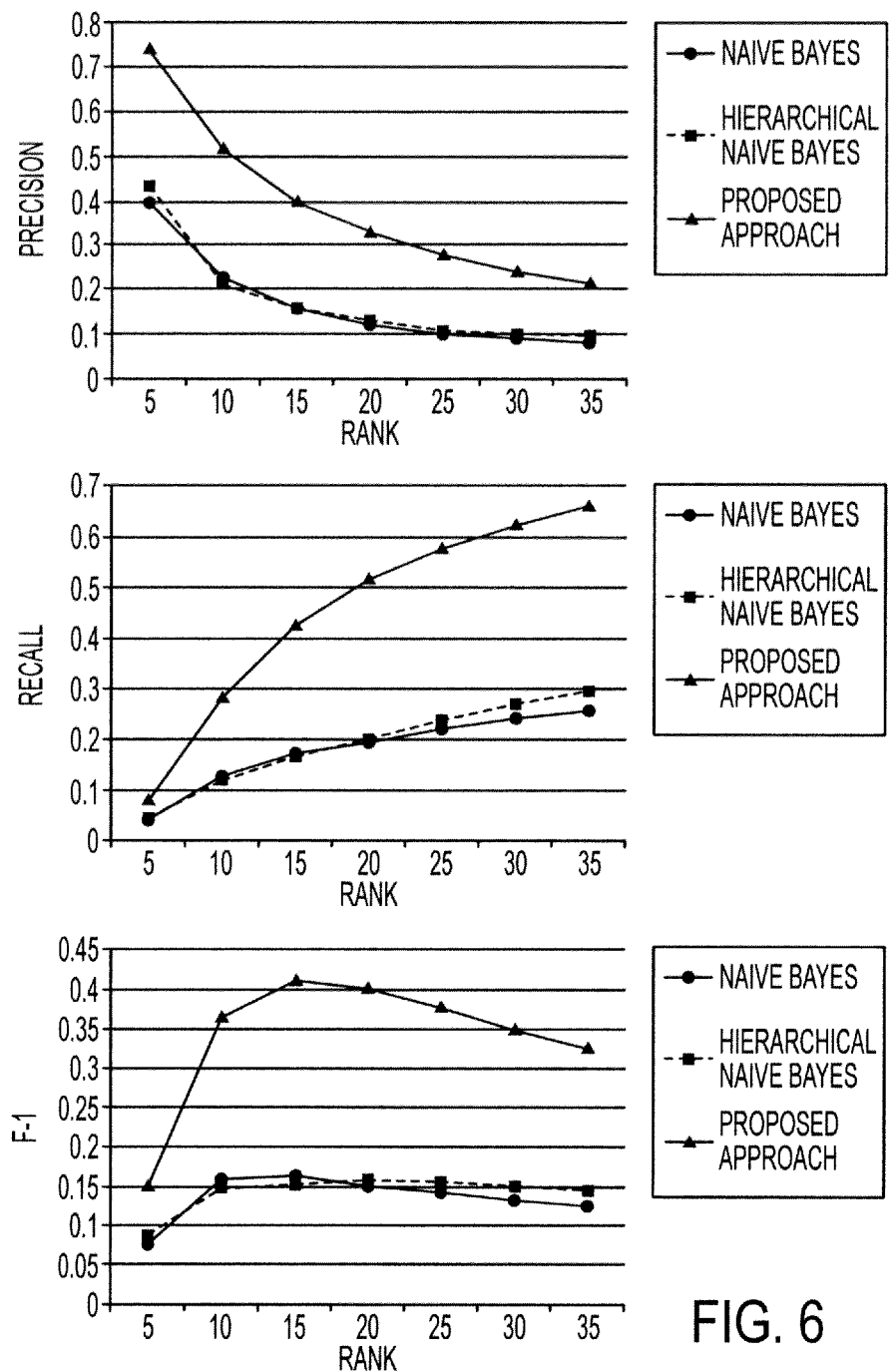
Figure 7:
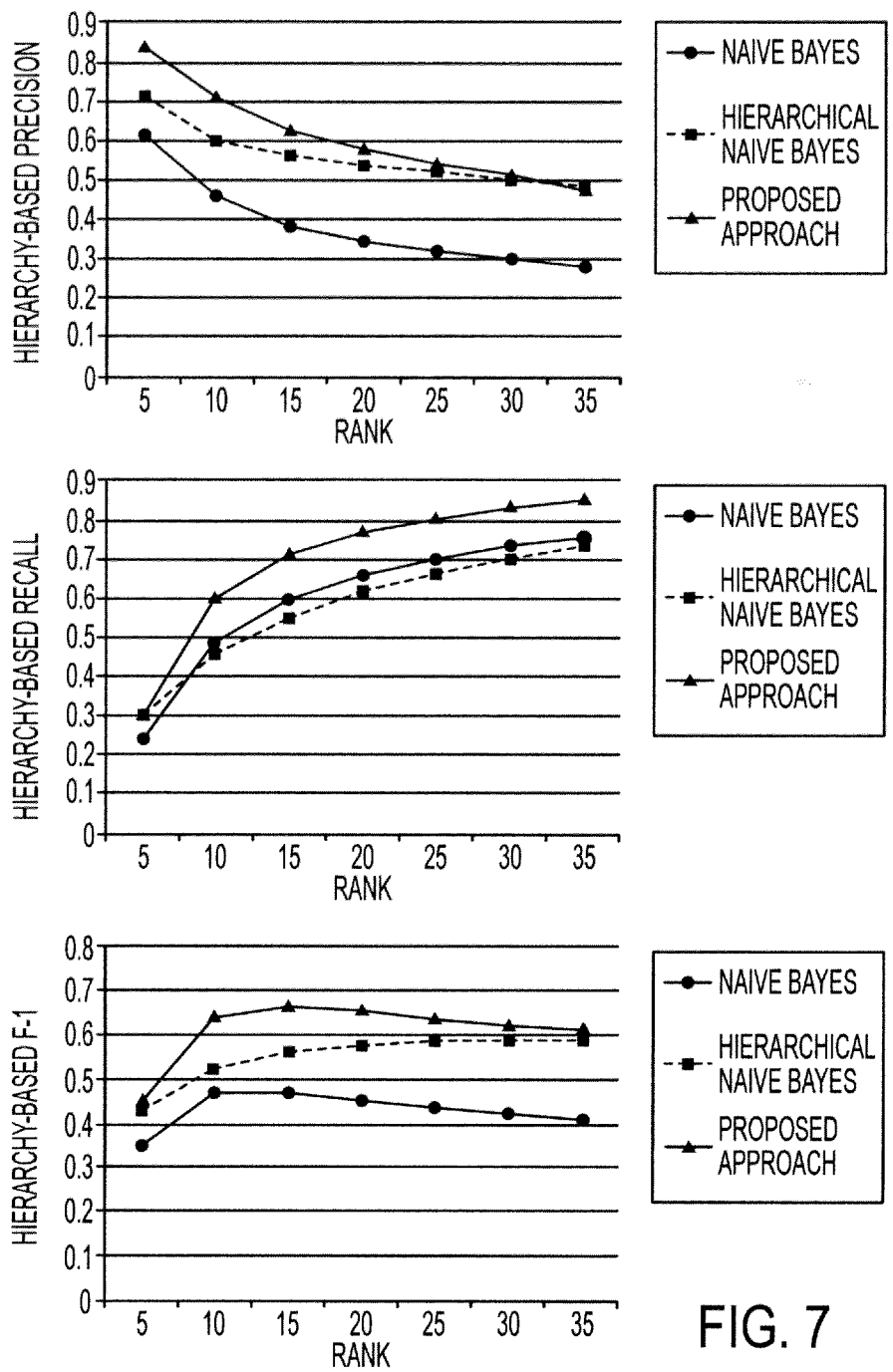

With reference to FIGS. 6 and 7, the automatic classification engine 44 performing the document classifying operation Op3 was compared with two baselines: a naïve Bayes classifier and a hierarchical naïve Bayes classifier. All of the three approaches employed the same category language models extracted by operation Op2 and a test document as inputs, and the three approaches were applied to rank the categories in decreasing order of relevance. FIG. 6 plots performance as measured by standard precision, recall and F-1 at different positions in the ranked list. FIG. 7 plots performance at different positions in the ranked list as measured by precision, recall and F-1 with hierarchy-based extensions of these measures. See Costa et al., "A review of performance evaluation measures for hierarchical classifiers", in Evaluation Methods for Machine Learning II: papers from the AAAI-2007 Workshop, pages 1-6, AAAI Press, 2007. The basic idea of these hierarchy extensions (FIG. 7) is that it is better to classify a document into a category near the correct one in the hierarchy, than into a totally unrelated category. Said another way, the cost of error depends on the similarity between the predicted category and the correct category. The similarity of two categories is defined by their respective positions in the hierarchy. Performances over all test documents were averaged in the data shown in FIGS. 6 and 7.

FIG. 6 shows standard precision, recall, and F-1 of the three approaches at ranks from 5 to 35. In terms of these standard measures, performances of the two baselines are similar. The classification approach of operation Op3 is consistently better than naive Bayes and hierarchical naive Bayes in terms of both precision and recall. In terms of F-1, the best performance of the classification approach of operation Op3 is 41%; whereas, the best performances of naive Bayes and hierarchical naive Bayes are 16%. Note that in this large-scale text classification problem, the classifiers are called upon to make difficult decisions amongst more than 1100 possible category choices.

FIG. 7 shows precision, recall, and F-1 with the hierarchy extensions. It is seen that the hierarchical naive Bayes is better than naive Bayes in terms of precision. However, the hierarchical naive Bayes is slightly worse than naive Bayes in terms of recall, which results in a ranked list of categories for each test document that is less diverse. As in the previous case (FIG. 6), the classification approach of operation Op3 is generally better than the two baselines in terms of both precision and recall. In terms of F-1, the classification approach of operation Op3 is around 13.4% and 41.2% better than hierarchical naive Bayes and naive Bayes.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory storage medium storing instructions executable by a processing device to perform a method comprising:

generating a hierarchical classifier for a taxonomy of hierarchically organized categories wherein each category is represented by one or more textual category descriptors, the hierarchical classifier being generated by a method including (i) constructing queries from the textual category descriptors representing the categories and querying a documents database using the constructed queries to retrieve pseudo-relevant documents and (ii) extracting language models comprising multinomial distributions over the words of a textual vocabulary for the categories of the taxonomy by inferring a hierarchical topic model representing the taxonomy from at least the pseudo-relevant documents; and classifying an input document different from the pseudo-relevant documents using the generated hierarchical classifier, the classifying comprising inferring mixture weights for a mixture of the extracted language models to approximate the multinomial distribution of words of the input document over the words of the textual vocabulary.

2. The non-transitory storage medium as set forth in claim 1, wherein the constructing of queries comprises:
constructing a query corresponding to each category of the taxonomy, the query for a category c of the taxonomy including:
a query component q(c) constructed from one or more textual category descriptors of the category c and
at least one of a query component $q(c\uparrow)$ constructed from one or more textual category descriptors of an ancestor category $c\uparrow$ of the category c and a query component $q(c\downarrow)$ constructed from one or more textual category descriptors of a descendant category $c\downarrow$ of the category c.

3. The non-transitory storage medium as set forth in claim 1, wherein the constructing of queries comprises:
constructing a query corresponding to each category of the taxonomy, the query for a category of the taxonomy including a weighted combination of:
a query component constructed from one or more textual category descriptors of the category and
at least one contextual query component selected from a group consisting of a query component constructed from one or more textual category descriptors of an ancestor category of the category and a query component constructed from one or more textual category descriptors of a descendant category of the category.

4. The non-transitory storage medium as set forth in claim 1, wherein the querying of a documents database comprises at least one of (i) inputting the constructed queries to an Internet search engine without any domain restriction, and (ii) inputting the constructed queries to an Internet search engine with a domain restriction.

5. The non-transitory storage medium as set forth in claim 1, wherein the hierarchical topic model comprises a hierarchical extension of the latent Dirichlet allocation (LDA) generative model and the inferring of a hierarchical LDA generative model representing the taxonomy comprises performing Gibbs sampling.

6. The non-transitory storage medium as set forth in claim 1, wherein the hierarchical topic model comprises a mixture model in which a document is represented as a mixture of the language models of a plurality of categories and their ancestor categories.

7. A method comprising:
constructing queries from category descriptors representing categories of a taxonomy of hierarchically organized categories;
querying a documents database using the constructed queries to retrieve pseudo-relevant documents;
extracting category profiles for the categories of the taxonomy from at least the pseudo-relevant documents by inferring a hierarchical topic model representing the taxonomy wherein the hierarchical topic model comprises a hierarchical extension of the latent Dirichlet allocation (LDA) generative model and the inferring of a hierarchical LDA generative model representing the taxonomy comprises performing Gibbs sampling; and
classifying an input document by optimizing mixture weights of a weighted combination of categories of the hierarchical topic model respective to the input document;
wherein at least the constructing, extracting, and classifying operations are performed by a digital processing device.

8. The method as set forth in claim 7, wherein the category descriptors comprise textual descriptors, the querying constructs textual queries from the textual descriptors, the retrieved pseudo-relevant documents include textual content, and the language models comprise multinomial distributions over the words of a textual vocabulary.

9. The method as set forth in claim 8, wherein the classifying comprises:
classifying the input document based on comparison of the multinomial distribution of words of the input document over the words of the textual vocabulary with sub-trees of the hierarchical topic model.

10. The method as set forth in claim 7, wherein the constructing of queries comprises:
constructing for a category c of the taxonomy a query including a weighted combination of:
a query component q(c) constructed from one or more textual descriptors of the category c and
at least one of a query component $q(c\uparrow)$ constructed from one or more textual descriptors of an ancestor category $c\uparrow$ of the category c and a query component $q(c\downarrow)$ constructed from one or more textual descriptors of a descendant category $c\downarrow$ of the category c.

11. The method as set forth in claim 7, wherein the querying of a documents database comprises at least one of (i) inputting the constructed queries to an Internet search engine without any domain restriction, and (ii) inputting the constructed queries to an Internet search engine with a domain restriction.

12. The method as set forth in claim 7, wherein the hierarchical topic model comprises a mixture model in which a document is represented as a mixture of the language models of a plurality of categories and their ancestor categories.

13. The method as set forth in claim 7, further comprising:
processing or archiving the input document based on an output of the classifying operation, wherein the processing or archiving is also performed by the digital processing device.

14. An apparatus comprising:
a digital processing device configured to:
generate a hierarchical classifier for a taxonomy of hierarchically organized categories wherein each category is represented by one or more category descriptors, the digital processing device generating the hierarchical classifier by a method including:
constructing queries for categories of the taxonomy of hierarchically organized categories, the query constructed for a category c of the taxonomy including a query component constructed from one or more textual descriptors of the category c and at least one of a query component constructed from one or more textual descriptors of an ancestor category of the category c and a query component constructed from textual descriptors of one or more descendant categories of the category c;
querying a documents database using the constructed queries to retrieve pseudo-relevant documents; and
extracting category profiles for the categories of the taxonomy from at least the pseudo-relevant documents by inferring a hierarchical topic model representing the taxonomy; and classify an input document different from the pseudo-relevant documents using the generated hierarchical classifier.

15. The apparatus as set forth in claim 14, wherein the digital processing device is configured to classify the input document by inferring mixture weights for a mixture of the extracted category profiles that models the input document.

16. The apparatus as set forth in claim 14, wherein the category descriptors comprise textual category descriptors and the category profiles are language models comprising multinomial distributions over the words of a textual vocabulary.

17. The apparatus as set forth in claim 16, wherein digital processing device is configured to classify the input document by inferring mixture weights for a weighted mixture of the language models that represents the multinomial distribution of words of the input document over the words of the textual vocabulary.

18. The apparatus as set forth in claim 14, wherein the querying of a documents database comprises inputting the constructed queries to an Internet search engine.

19. The apparatus as set forth in claim 14, wherein the hierarchical topic model comprises a hierarchical extension of the latent Dirichlet allocation (LDA) generative model and the inferring employs a Gibbs sampling algorithm.

20. The apparatus as set forth in claim 14, wherein the hierarchical topic model comprises a mixture model in which a document is represented as a mixture of the category profiles of a plurality of categories and their ancestor categories.

21. The apparatus as set forth in claim 14, wherein the extracting comprises:

extracting category profiles for the categories of the taxonomy from the pseudo-relevant documents augmented by a sparse set of manually labeled documents by inferring a hierarchical topic model representing the taxonomy.

* * * * *